(12) United States Patent
Mogi et al.

(10) Patent No.: US 9,765,904 B2
(45) Date of Patent: Sep. 19, 2017

(54) DIAPHRAGM-ACTUATED FLUID CONTROL VALVE

(75) Inventors: Takashi Mogi, Tokyo (JP); Mafumi Morita, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 224 days.

(21) Appl. No.: 12/801,277

(22) Filed: Jun. 1, 2010

(65) Prior Publication Data

US 2010/0320410 A1    Dec. 23, 2010

(30) Foreign Application Priority Data

Jun. 23, 2009  (JP) ................................. 2009-148550

(51) Int. Cl.
   *F16K 31/00*   (2006.01)
   *F16K 31/126*  (2006.01)
   *F25B 41/06*   (2006.01)

(52) U.S. Cl.
   CPC ........ *F16K 31/1262* (2013.01); *F25B 41/062* (2013.01)

(58) Field of Classification Search
   CPC ....... F25B 41/062; F25B 41/0683; F16J 3/02; G01L 7/082; F16K 31/1262
   USPC ....... 251/61.2, 331, 335.2; 92/104; 236/92 B
   See application file for complete search history.

(56) References Cited

U.S. PATENT DOCUMENTS 769,050 A * 8/1904 Boekel ...................... 137/505.41
807,813 A * 12/1905 Fiske ............................ 137/465
1,237,980 A * 8/1917 Webster ....................... 251/61.2
1,237,981 A * 8/1917 Webster ......................... 251/281
2,472,149 A * 6/1949 Dillman ....................... 236/92 B (Continued)

FOREIGN PATENT DOCUMENTS

CN        1332348 A     1/2002
CN        1782626 A     6/2006

(Continued)

OTHER PUBLICATIONS

Office Action from Chinese Patent Office in corresponding Chinese Application No. 201010211782.5, issued Mar. 27, 2013, pp. 1-8.

(Continued)

*Primary Examiner* — Jessica Cahill
(74) *Attorney, Agent, or Firm* — Joan Carlos A. Marquez; Marquez IP Law Firm, PLLC

(57) ABSTRACT

Provided is a diaphragm-actuated fluid control valve capable of, even in a region where the pressure difference between the pressures on the upper surface side and the lower surface side of a diaphragm is small, significantly changing the amount of lift of the diaphragm relative to the change in the pressure difference, without reducing the thickness of the diaphragm, and thus is capable of providing a predetermined flow rate and performing stable flow rate control. The control valve has a diaphragm 35 for driving a valve 25. The diaphragm 35 has a mountainous-wave portion 35b formed between an outermost portion 35a and an innermost portion 35c thereof, the mountainous-wave portion having the shape of concentric circles when viewed in a plan view and having N+(0.25 to 0.75) elevated portions that protrude upward or downward when viewed in cross section, where N is a positive integer (1, 2, 3, . . . ).

23 Claims, 6 Drawing Sheets

(56) References Cited

U.S. PATENT DOCUMENTS

| | | | |
|---|---|---|---|
| 2,502,630 A * | 4/1950 | Morrison | 137/614 |
| 3,388,864 A * | 6/1968 | Noakes | 236/92 B |
| 3,738,573 A * | 6/1973 | Eschbaugh et al. | 236/92 B |
| 4,032,070 A * | 6/1977 | Nielsen | 236/92 B |
| 4,275,997 A * | 6/1981 | Woodring et al. | 417/218 |
| 4,867,201 A * | 9/1989 | Carten | 137/625.18 |
| 5,186,207 A * | 2/1993 | Kaneko et al. | 137/495 |
| 5,238,219 A * | 8/1993 | Noelke et al. | 251/61.3 |
| 6,062,484 A * | 5/2000 | Eybergen | 236/92 B |
| 6,612,503 B2 * | 9/2003 | Hirota et al. | 236/92 B |
| 7,483,695 B2 * | 1/2009 | Uchino et al. | 455/426.2 |
| 8,104,397 B2 * | 1/2012 | Gelnett | 92/104 |
| 2002/0023966 A1 | 2/2002 | Minowa et al. | |
| 2004/0026523 A1 * | 2/2004 | Kobayashi | F25B 41/062 236/92 B |
| 2004/0041119 A1 | 3/2004 | Christen et al. | |
| 2004/0079811 A1 * | 4/2004 | Matsuda et al. | 236/92 B |
| 2004/0200530 A1 * | 10/2004 | Dalton et al. | 137/489 |
| 2005/0120741 A1 * | 6/2005 | Nanbu et al. | 62/527 |
| 2006/0117774 A1 | 6/2006 | Ise et al. | |
| 2007/0209387 A1 | 9/2007 | Hirota | |
| 2007/0227183 A1 | 10/2007 | Ohta | |
| 2008/0185452 A1 * | 8/2008 | Kobayashi | F25B 41/062 236/92 B |

FOREIGN PATENT DOCUMENTS

| | | |
|---|---|---|
| CN | 101101064 A | 1/2008 |
| JP | 57-198471 | 6/1981 |
| JP | 59-132059 | 9/1984 |
| JP | 2002-147899 | 5/2002 |
| JP | 2007-240041 | 9/2007 |
| JP | 2008-039262 A | 2/2008 |
| JP | 2009-024945 A | 2/2009 |
| JP | 2009-196473 A | 9/2009 |
| JP | 2001-124441 A | 5/2011 |

OTHER PUBLICATIONS

Office Action from Japanese Patent Office in corresponding Japanese Application No. 2009-148550, issued Jun. 11, 2013.
Extended European Search Report, mailed Jun. 20, 2014, in corresponding European application No. 10006419.5, 3 pages.

* cited by examiner

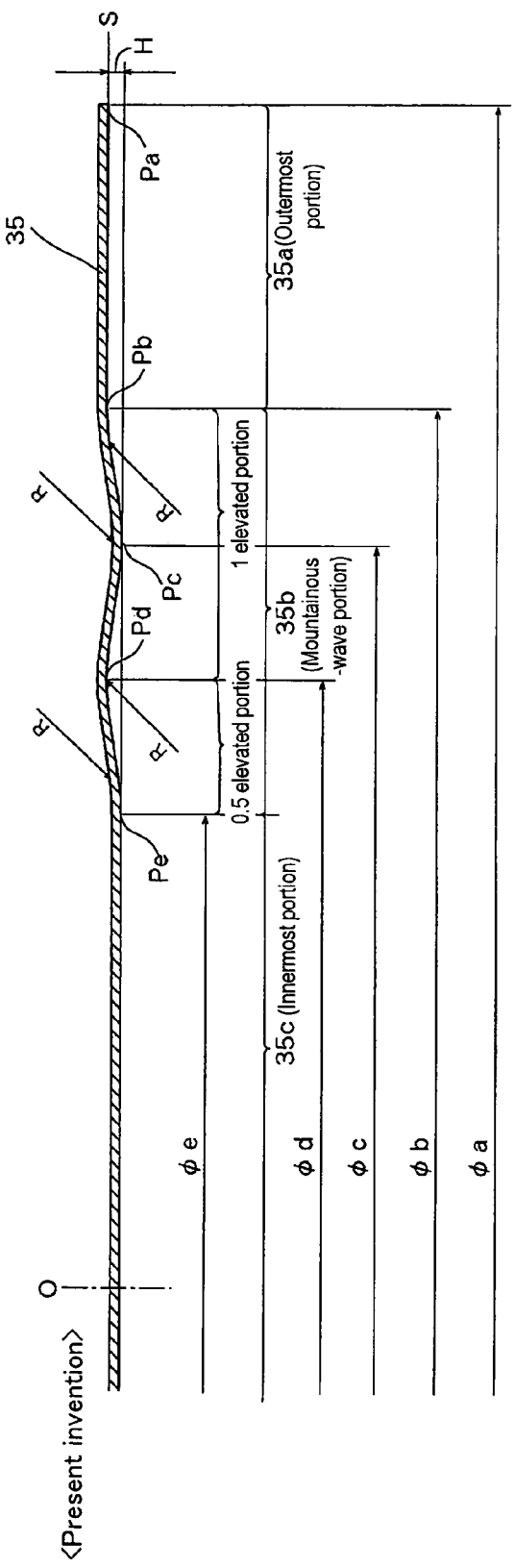
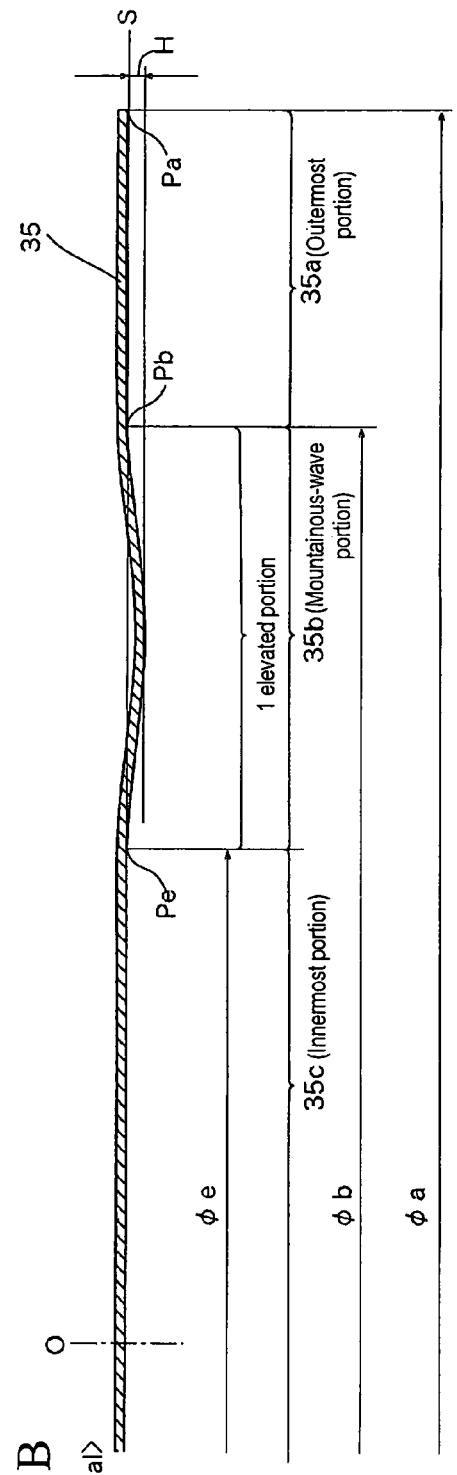
FIG. 3A ⟨Present invention⟩
FIG. 3B ⟨Conventional⟩

DIAPHRAGM-ACTUATED FLUID CONTROL VALVE

BACKGROUND OF THE INVENTION

Field of the Invention

The present invention relates to a diaphragm-actuated fluid control valve with a valve-driving diaphragm for controlling the flow rate or pressure of a fluid. In particular, the invention relates to a diaphragm-actuated fluid control valve which is suitable as an expansion valve used in the refrigeration cycle of air conditioners for vehicles and the like.

Background Art

As an example of an expansion valve used in the refrigeration cycle, there is known a diaphragm-actuated fluid control valve as disclosed in Reference 1 (JP Patent Publication (Kokai) No. 2007-240041 A). Specifically, this known control valve includes a valve for controlling the flow rate or pressure of a fluid (refrigerant), a valve body having an inlet port, an outlet port, and a valve opening (orifice) provided therebetween, which is adapted to be opened or closed by the valve, and a diaphragm device adapted to drive the valve in a direction to open or close the orifice.

In such a diaphragm-actuated fluid control valve, the diaphragm device typically has a diaphragm and a diaphragm-holding member that fixedly seals the outermost portion of the diaphragm in a manner sandwiching the outermost portion and defines a pressure chamber (also referred to as a "temperature-sensing chamber," a "diaphragm chamber," or the like) on the upper surface side of the diaphragm as a sealed space. In addition, an actuating rod is connected to the lower surface of the diaphragm so as to transmit the behavior (displacement) of the diaphragm to the valve.

One end of a capillary tube, for example, is inserted in the pressure chamber (the temperature-sensing chamber), and the other end of the capillary tube is provided with a thermo bulb (temperature sensing cylinder) which senses the temperature of refrigerant on the outlet side of an evaporator, for example. It should be noted that the interior of each of the temperature-sensing chamber, the capillary tube, and the thermo bulb is typically filled with a predetermined gas (e.g., carbon dioxide) with a predetermined pressure.

The diaphragm has a mountainous-wave portion formed between the outermost portion thereof, which is fixedly sealed by the diaphragm-holding member, and the innermost portion thereof on which a large-diameter disk portion abuts, the mountainous-wave portion having the shape of concentric circles when viewed in a plan view and having N elevated portions that protrude upward or downward when viewed in cross section, where N is a positive integer (1, 2, 3, . . . ).

In the diaphragm-actuated fluid control valve with the aforementioned structure, the diaphragm (the innermost portion of the diaphragm with respect to the outermost portion thereof) is typically displaced (flexes) in the up or down direction in accordance with the pressure difference between the pressure of the pressure chamber (the temperature-sensing chamber) (hereinafter referred to as "pressure on the upper surface side of the diaphragm") and the pressure that acts on the lower surface of the diaphragm (hereinafter referred to as "pressure on the lower surface side of the diaphragm"). Such displacement is transmitted to the valve via the actuating rod, which in turn causes the valve to move in the orifice-opening or closing direction (the up or down direction) so that the valve opening degree (=the amount of lift=an effective opening area of the orifice) is controlled. Accordingly, the pressure (flow rate) of a fluid (refrigerant) flowing from the inlet port to the outlet port is controlled.

SUMMARY OF THE INVENTION

The conventional diaphragm-actuated fluid control valve described above, however, has the following problems to be solved. That is, in a region (an ultralow temperature region) where the pressure difference between the pressures on the upper surface side and the lower surface side of the diaphragm is small, the change in the amount of lift of the diaphragm is small relative to the change in the pressure difference. Thus, the flow rate of refrigerant would not change much. This is problematic in that a predetermined flow rate is difficult to be provided and stable flow rate control is difficult to perform.

Further, when the diameter of a diaphragm is reduced for the purpose of reducing the cost of parts or materials, for example, the change in the amount of lift can similarly become smaller, which is problematic in that stable flow rate control is difficult to perform.

In order to significantly change the amount of lift of a diaphragm relative to the change in the pressure difference, the following measures can be considered: reducing the thickness of the diaphragm, increasing the diameter of the diaphragm, and the like. However, reducing the thickness of the diaphragm can result in insufficient strength of the diaphragm and thus can easily break the diaphragm, which is problematic in that durability of the diaphragm could decrease. Further, the diaphragm can have a tendency to flex too easily, which could result in the decreased stability of flow rate control. Meanwhile, increasing the diameter of the diaphragm can result in a cost increase.

The present invention has been made in view of the foregoing problems. It is an object of the present invention to provide a diaphragm-actuated fluid control valve which is capable of, even in a region where the pressure difference between the pressures on the upper surface side and the lower surface side of a diaphragm is small, significantly changing the amount of lift of the diaphragm relative to the change in the pressure difference, without reducing the thickness of the diaphragm, and thus is capable of providing a predetermined flow rate and performing stable flow rate control.

In order to achieve the aforementioned object, a diaphragm-actuated fluid control valve in accordance with the present invention basically has a diaphragm that drives a valve. The diaphragm has a mountainous-wave portion formed between the outermost portion and the innermost portion thereof, the mountainous-wave portion having the shape of concentric circles when viewed in a plan view and having N+(0.5) elevated portions that protrude upward or downward when viewed in cross section, where N is a positive integer (1, 2, 3).

More specifically, the diaphragm-actuated fluid control valve has a valve for controlling the flow rate or pressure of a fluid, a valve body with an inlet port, an outlet port, and an orifice provided therebetween, the orifice being adapted to be opened or closed by the valve, and a diaphragm device adapted to drive the valve in a direction to open or close the orifice. The diaphragm device has a diaphragm and a diaphragm-holding member that fixedly seals the outermost portion of the diaphragm and defines a pressure chamber on the upper surface side of the diaphragm. The diaphragm has a mountainous-wave portion formed between the outermost portion and the innermost portion thereof, the mountainous-wave portion having the shape of concentric circles when viewed in a plan view and having N+(0.5) elevated portions that protrude upward or downward when viewed in cross section, where N is a positive integer (1, 2, 3).

More preferably, the diaphragm-actuated fluid control valve is configured to function as an expansion valve used in the refrigeration cycle. In a preferred embodiment, the number of the elevated portions formed in the mountainous-wave portion of the diaphragm is two or more, and the heights of the elevated portions are substantially the same.

In an alternative preferred embodiment, provided that the top surface or the bottom surface of the outermost portion or the innermost portion of the diaphragm is the reference plane and that the difference in elevation between the reference plane and the vertex is 1, the difference in elevation between the reference plane and the inner end or the outer end of the mountainous-wave portion is 0.25 to 1.

For the diaphragm, a thin stainless steel plate with a thickness of 0.05 to 0.15 mm is preferably used. The outer diameter and the inner diameter of the mountainous-wave portion of the diaphragm are preferably 18 to 35 mm and 10 to 22 mm, respectively.

In a further alternative preferred embodiment, provided that the top surface or the bottom surface of the outermost portion or the innermost portion of the diaphragm is the reference plane, each of the difference in elevation between the reference plane and the vertex and the difference in elevation between the reference plane and the inner end or the outer end of the mountainous-wave portion is in the range of 0.10 to 0.50 mm. In a more preferred embodiment, the number of the elevated portions of the mountainous-wave portion is N+0.5.

In a further preferred embodiment, provided that the top surface or the bottom surface of the outermost portion of the diaphragm is the reference plane, the difference in elevation between the reference plane and the vertex is the same as the difference in elevation between the reference plane and the inner end of the mountainous-wave portion.

A diaphragm for a fluid control valve in accordance with the present invention has a mountainous-wave portion formed between the outermost portion and the innermost portion thereof, the mountainous-wave portion having the shape of concentric circles when viewed in a plan view and having N+(0.5) elevated portions that protrude upward or downward when viewed in cross section, where N is a positive integer (1, 2, 3).

The diaphragm-actuated fluid control valve in accordance with the present invention is designed such that the diaphragm has a mountainous-wave portion formed between the outermost portion and the innermost portion thereof, wherein the mountainous-wave portion, which conventionally has N (without fractions) elevated portions, has N+(0.5) elevated portions. Thus, even in a region where the pressure difference between the pressures on the upper surface side and the lower surface side of the diaphragm is small, the amount of lift of the diaphragm can be significantly changed relative to the change in the pressure difference. Consequently, a predetermined flow rate can be provided and stable flow rate control can be performed. Further, since the diameter of the diaphragm can be reduced with the same amount of lift as that of the conventional diaphragm, the cost of materials can be reduced.

BRIEF DESCRIPTION OF THE DRAWINGS

FIG. 3A is an enlarged view of a diaphragm shown in FIG. 1 and FIG. 3B is an enlarged view of a conventional diaphragm.

Figure 1:
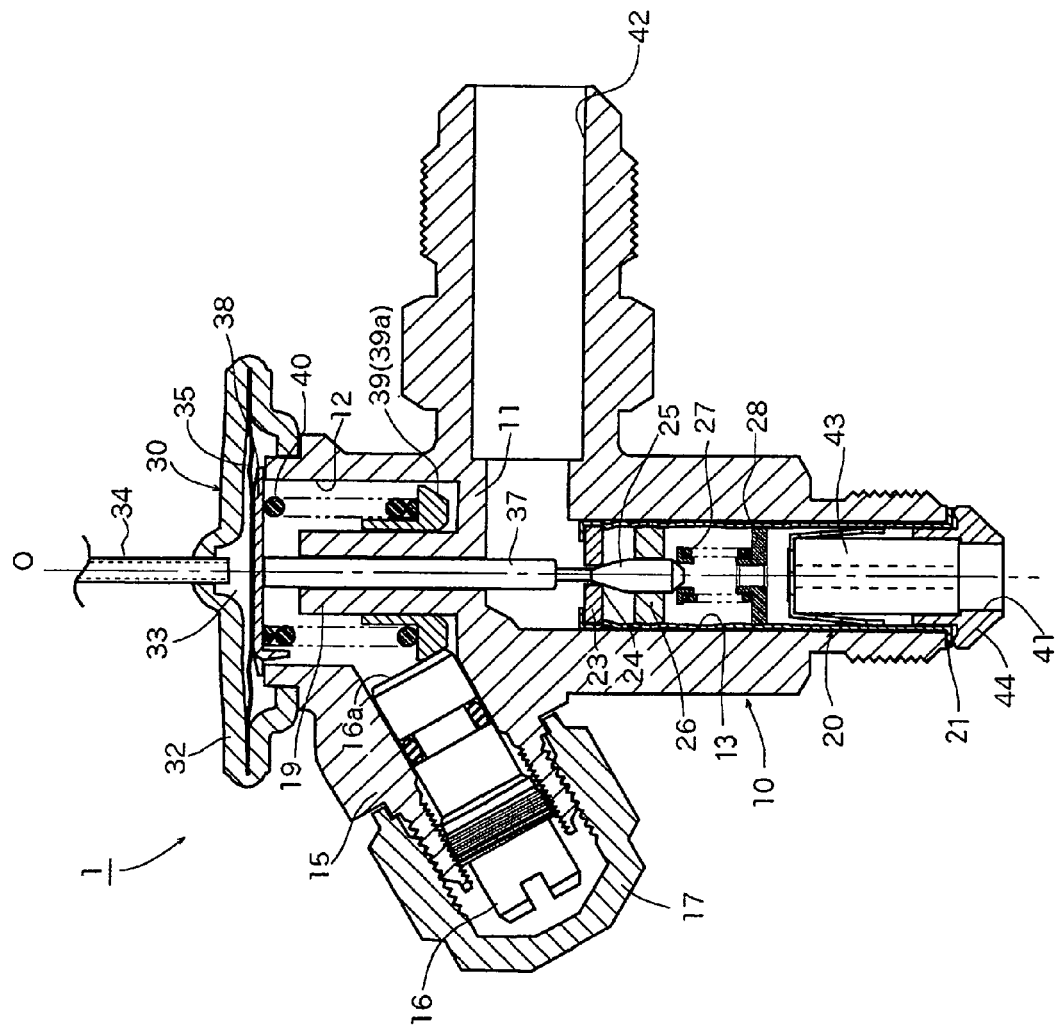
FIG. 1 is a longitudinal cross-sectional view showing an embodiment of a diaphragm-actuated fluid control valve in accordance with the present invention.

DESCRIPTION OF SYMBOLS 1, 2 diaphragm-actuated fluid control valve (expansion valve)
10 valve body
12 pressure chamber on the lower surface side of the diaphragm
20 valve/orifice assembly
24 orifice (valve opening)
25 valve
30 diaphragm device
33 pressure chamber on the upper surface side of the diaphragm
35 diaphragm
35b mountainous-wave portion
37 actuating rod
41 inlet port
42 outlet port

DETAILED DESCRIPTION OF THE PREFERRED EMBODIMENTS

Hereinafter, embodiments of a diaphragm-actuated fluid control valve of the present invention will be described with reference to the accompanying drawings. FIG. 1 is a longitudinal cross-sectional view showing an embodiment of a diaphragm-actuated fluid control valve in accordance with the present invention. A diaphragm-actuated fluid control valve 1 shown in FIG. 1 is used as an expansion valve in the refrigeration cycle. This valve 1 includes a valve body 10 and a diaphragm device 30 secured to the upper portion of the valve body 10.

The valve body 10 has a chamber 12, which functions as both a spring chamber and a pressure chamber on the lower surface side of the diaphragm, formed above a partition 11. The valve body 10 also has a through-hole 13, into which an inlet port 41 and a valve/orifice assembly 20 described below are adapted to be inserted, formed below the partition 11.

The valve body 10 also has a cylindrical screw-receiving portion 15 inclined downward at an angle of about 60 degrees with respect to the central axis 0. An adjusting screw 16 (described below) is screwed into the inner circumferential wall of the screw-receiving portion 15. A cap nut 17 is screwed onto the outer circumferential wall of the screw-receiving portion 15.

The diaphragm device 30 includes a diaphragm 35 (described below) and a diaphragm-holding member 32 that fixedly seals the outermost portion of the diaphragm 35 in a manner sandwiching the outermost portion and defines a pressure chamber (a temperature-sensing chamber) 33 on the upper surface side of the diaphragm as a sealed space.

One end of a capillary tube 34, for example, is inserted in the pressure chamber (the temperature-sensing chamber) 33, and the other end of the capillary tube 34 is provided with a thermo bulb (not shown) which senses the temperature of refrigerant on the outlet side of an evaporator, for example. It should be noted that the interior of each of the pressure chamber 33, the capillary tube 34, and the thermo bulb is filled with a predetermined gas (e.g., carbon dioxide) with a predetermined pressure.

In order to transmit the behavior (displacement) of the diaphragm 35 to a valve 25 (described below), an actuating rod 37, which is slidably inserted into a cylindrical guide portion 19 arranged vertically within the partition 11 of the valve body 10, is connected to the lower surface of the diaphragm 35 via a large-diameter disk member 38. The large-diameter disk member 38 abuts on the innermost portion (central portion) of the lower surface of the diaphragm 35. It should be noted that the outermost portion of the large-diameter disk member 38 is adapted to receive a spring and also to function as a stopper which, in abutment with the upper end surface of the valve body 10, limits excessive displacement of the diaphragm 35 in the downward direction (the valve-opening direction).

A spring-receiving member 39 is slidably fitted around the outer circumference of the cylindrical guide portion 19. A compression coil spring 40 that urges the diaphragm 35 upward is disposed in a contracted position between the spring-receiving member 39 and the large-diameter disk member 38.

The peripheral portion of the spring-receiving member 39 has an inclined surface 39a that abuts on an apical surface 16a of the adjusting screw 16. Changing the amount of screwing of the adjusting screw 16 into the screw-receiving portion 15 can adjust the preload of the compression coil spring 40.

The valve/orifice assembly 20 is used in common by a plurality of kinds of expansion valves with different capacities. Specifically, the valve/orifice assembly 20 has a cylindrical body 21 inserted into the through-hole 13. A valve seat member 23 with an orifice 24 formed therein is secured to the upper end of the cylindrical body 21. A valve guide member 26, which has formed therein a valve guide hole and a plurality of openings to serve as flow channels, is secured on the lower side of the valve seat member 23. The valve 25 with a conical surface portion, which opens or closes the orifice 24, is slidably fitted into the valve guide member 26.

A lower-side spring-receiving member 28 having a central flow passage is secured on the lower side of the valve 25 in the cylindrical body 21. A valve-closing spring 27 composed of a compression coil spring, which always urges the valve 25 in the valve-closing direction, is disposed in a contracted position between the lower-side spring-receiving member 28 and the conical surface portion of the bottom of the valve 25. A holding member 44 with a strainer 43 and the inlet port 41 formed therein is secured to the bottom of the cylindrical body 21.

It should be noted that in the refrigeration cycle with the present control valve (expansion valve) 1, refrigerant flowing from a condenser first enters into the inlet port 41, and then flows through the strainer 43 and further through a channel between (is throttled through) the valve 25 and the orifice 24, and finally flows into an evaporator through an outlet port 42. The pressure of the refrigerant throttled through the valve 25 and the orifice 24 acts on the chamber 12 functioning as both a spring chamber and a pressure chamber on the lower surface side of the diaphragm.

With such a structure, the diaphragm 35 is displaced (flexes) in the up or down direction in accordance with the pressure difference between the pressure of the upper surface side of the diaphragm (the pressure of the pressure chamber (the temperature-sensing chamber) 33) and the pressure on the lower surface side of the diaphragm (the pressure of the pressure chamber 12 on the lower surface side of the diaphragm) that acts on the lower surface of the diaphragm 35. Such displacement is transmitted to the valve 25 via the actuating rod 37, which causes the valve 25 to move in the orifice-opening or closing direction (the up or down direction) so that the valve opening degree (=the amount of lift=an effective opening area of the orifice) is controlled. Accordingly, the flow rate of the refrigerant flowing from the inlet port 41 to the outlet port 42 is controlled.

Figure 2A:
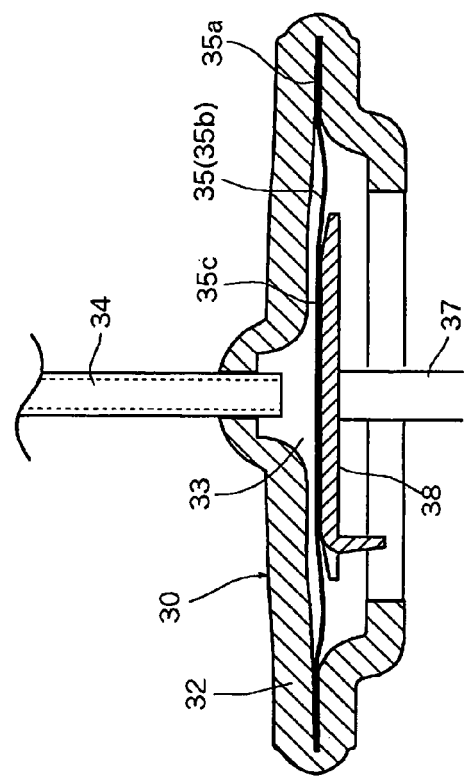
FIG. 2A is an enlarged view of the part of a diaphragm device shown in FIG. 1

In this embodiment, as can be clearly understood from FIG. 2A and FIG. 3A, the diaphragm 35 has, in addition to the aforementioned structure, a mountainous-wave portion 35b formed between an outermost portion 35a, which is secured by the diaphragm-holding member 32, and an innermost portion 35c on which the large-diameter disk member 38 abuts, the mountainous-wave portion 35b having the shape of concentric circles when viewed in a plan view and having one and a half (1.5) elevated portions that protrude downward when viewed in cross section.

More specifically, the diaphragm 35 is formed in the shape of a disk with the use of a thin stainless steel plate (e.g., ASL350) with a thickness of 0.10 mm. The outer diameter $\phi a$ (Pa-Pa) of the diaphragm is 38.9 mm. The outer diameter $\phi b$ (Pb-Pb) of the mountainous-wave portion 35b is 28.5 mm, and the inner diameter $\phi e$ (Pc-Pc) of the mountainous-wave portion 35b (the outer diameter of the innermost portion 35c) is 16.0 mm. The diameter $\phi c$ of the vertex Pc of a single elevated portion is 24.4 mm, and the diameter $\phi d$ of the end point Pd of a single elevated portion is 19.8 mm. The radius R of a line drawn from the vertex to the foot of the mountainous-wave portion 35b is 4.0 mm. Provided that the lower surface of the outermost portion 35a of the diaphragm 35 is the reference plane S, the difference H in elevation between the reference plane S and the vertex (Pc) and the difference in elevation between the reference plane S and the inner end (Pe) of the mountainous-wave portion 35b are each 0.30 mm.

Figure 2B:
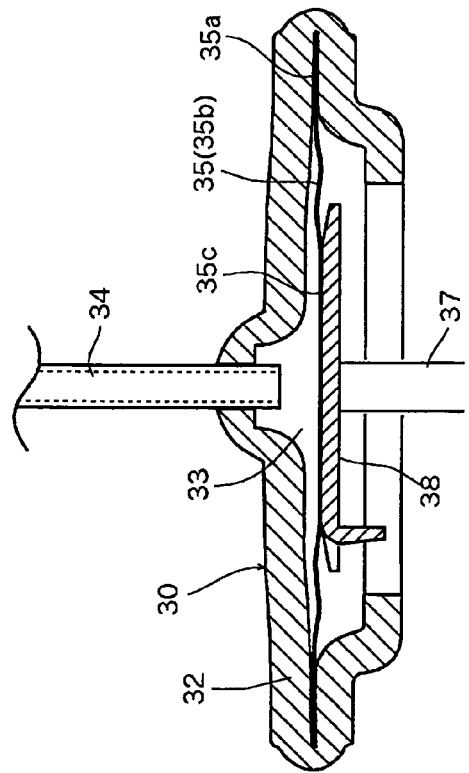
FIG. 2B is an enlarged view of the part of a conventional diaphragm device.

In contrast, the mountainous-wave portion 35b of the conventional diaphragm 35 has, as exemplarily shown in FIG. 2B and FIG. 3B, only a single (without fractions) elevated portion. Although the difference H in elevation between the reference plane S and the vertex (Pc) is 0.30 mm as with the present invention shown in FIG. 3A, the difference in elevation between the reference plane S and the inner end (Pe) of the mountainous-wave portion 35b is 0 mm (no difference).

Herein, in order to verify the operational effect of the present invention, diaphragms with mountainous-wave portions 35b having different numbers of elevated portions were prepared as indicated by (a) to (h) below, as the diaphragms of the present invention and the conventional diaphragms. Then, the amount of lift of each diaphragm (FIG. 4) relative to the pressure on the lower surface side of the diaphragm, and the amount of lift of each diaphragm (FIG. 5) relative to the pressure difference between the pressures on the upper surface side and the lower surface side of the diaphragm were measured.

(a) 1.5 elevated portions (the aforementioned embodiment), (b) 2.5 elevated portions, (c) 3.5 elevated portions, (d) 2.25 elevated portions, (e) 2.75 elevated portions, (f) 1.0 elevated portion (the aforementioned example of the conventional diaphragm), (g) 2.0 elevated portions, and (h) 3.0 elevated portions For each of the diagrams (a) to (h) above, the thickness, the material, the outer diameter φa, the outer diameter φb and inner diameter φe of the mountainous-wave portion 35b, the difference H in elevation between the reference plane S and the vertex, and the like were all set equal (though the radius R of a line drawn from the vertex to the foot of the mountainous-wave portion 35b differs), and the amount of lift of each diaphragm was measured under the same environment and conditions.

Figure 4:
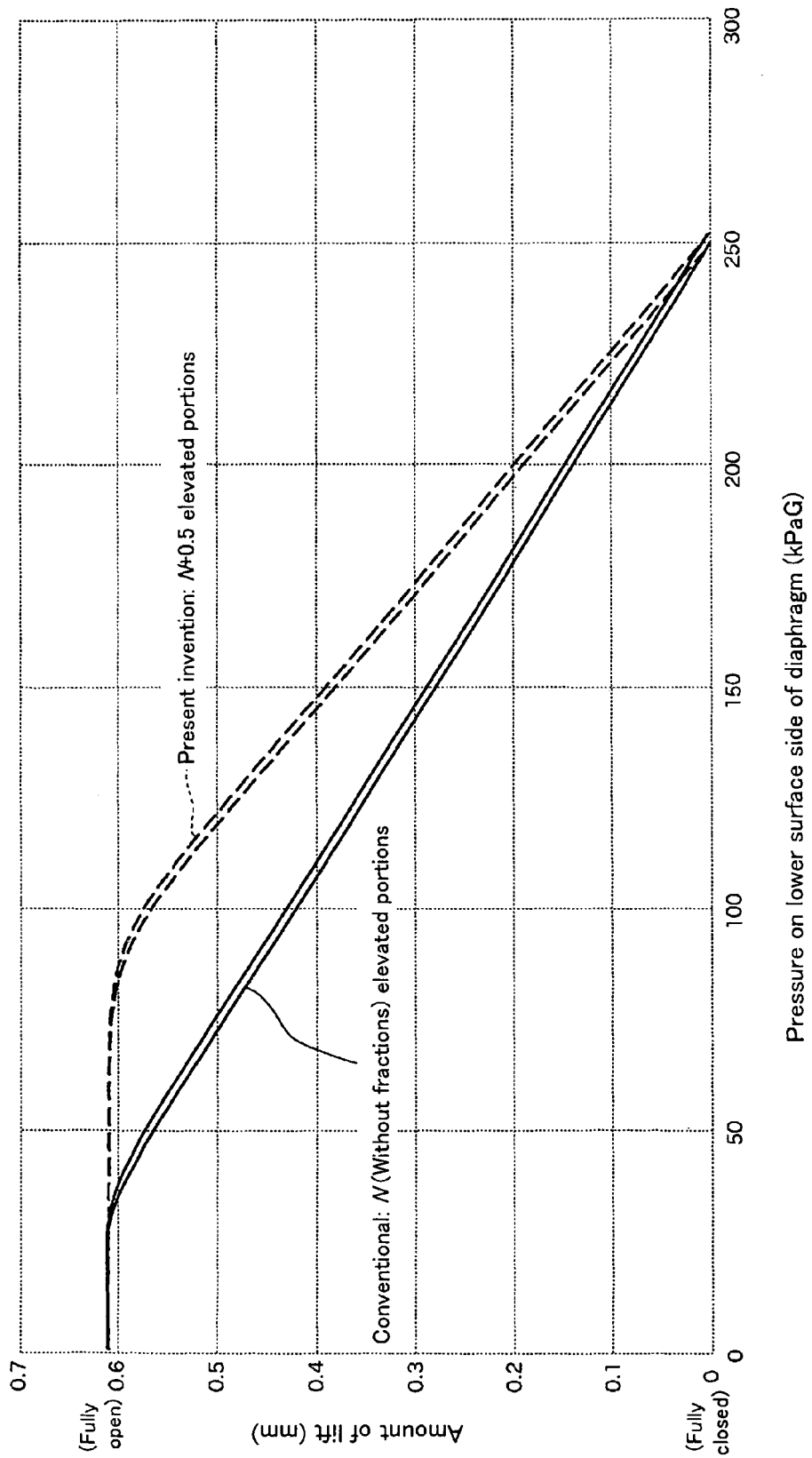
FIG. 4 is a graph used for the illustration of the characteristics of a diaphragm in accordance with the present invention (the number of elevated portions: N+0.5) and of a conventional diaphragm (the number of elevated portions: N).
Figure 5:
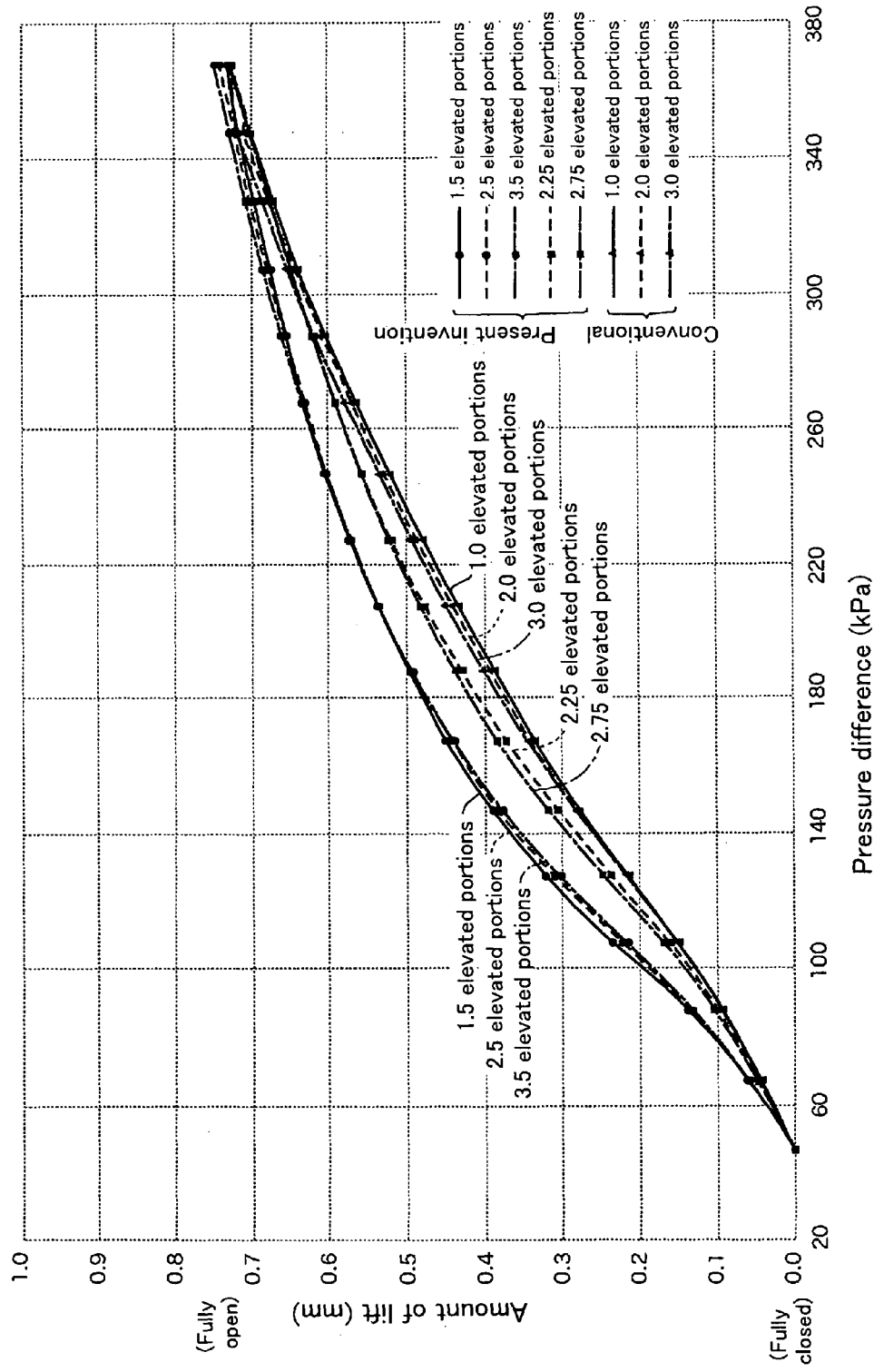
FIG. 5 is a graph for illustrating the operational effect of the present invention compared to that of the conventional technique.

FIG. 4 shows the amount of lift of each diaphragm relative to the pressure on the lower surface side of the diaphragm (with the atmospheric pressure: kPaG as the reference pressure). Specifically, the dashed line indicates the amount of lift of a diaphragm with N+0.5 elevated portions (the present invention), where N is a positive integer (1, 2, 3), and the solid line indicates the amount of lift of a diaphragm with N (without fractions) elevated portions (conventional). FIG. 5 shows the amount of lift of each of the diaphragms (a) to (h) above relative to the pressure difference (kPa) between the pressures on the upper surface side and the lower surface side of the diaphragm.

FIGS. 4 and 5 can confirm that the amount of lift of the diaphragm with N+0.5 elevated portions (the present invention) is large in substantially the entire region of the pressure difference (the pressure on the lower surface side of the diaphragm) than that of the diaphragm with N (without fractions) elevated portions (conventional) and, in particular, that the change in the amount of lift of the diaphragm of the present invention relative to the change in the pressure difference is significantly greater than that of the conventional diaphragm in a region where the pressure difference is small (an ultralow temperature region).

Therefore, the amount of lift of the diaphragm 35 can be significantly changed relative to the change in the pressure difference even in a region where the pressure difference between the pressures on the upper surface side and the lower surface side of the diaphragm 35 is small. Consequently, a predetermined flow rate can be provided and stable flow rate control can be performed. Further, since the diameter of such a diaphragm can be reduced with the same amount of lift as that of the conventional diaphragm, the cost of materials can be reduced.

Further, not only the diaphragm with N+0.5 elevated portions, but also the diaphragms with (d) 2.25 elevated portions and (e) 2.75 elevated portions exhibit a large amount of lift than the conventional diaphragms in substantially the entire region. In particular, since the change in the amount of lift relative to the change in the pressure difference is large to a certain degree in a region where the pressure difference is small (an ultralow temperature region), diaphragms with N+(0.25 to 0.75) elevated portions can be said to provide substantial advantageous effects even though such effects are smaller than those of diaphragms with N+0.5 elevated portions.

Figure 6:
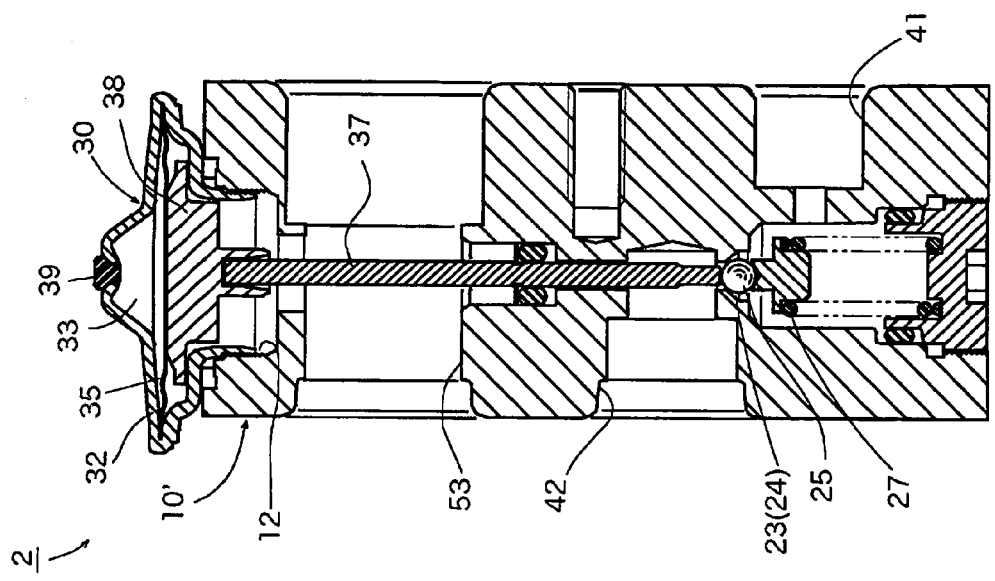
FIG. 6 is a longitudinal cross-sectional view showing another embodiment of a diaphragm-actuated fluid control valve in accordance with the present invention.

FIG. 6 shows another embodiment of a diaphragm-actuated fluid control valve in accordance with the present invention. This embodiment shows a case in which the present invention is applied to a box-shaped control valve (expansion valve). Parts corresponding to or parts with the same functions as those of the aforementioned embodiment are denoted by the same numerals. In this embodiment, the aforementioned diaphragm with 1.5 elevated portions is used as the diaphragm 35 of the diaphragm device 30. The pressure chamber 33 of the diaphragm device 30 is sealed with a cap 39. In the upper portion of a box-shaped valve body 10', a flow passage 53 having an inlet port for refrigerant flowing from an evaporator and an outlet port communicating with a suction side of a compressor is formed so that refrigerant flowing through the flow passage 53 is introduced into the pressure chamber 12 on the lower surface side of the diaphragm 12.

The diaphragm 35 of the box-shaped expansion valve 2 with such a structure also has the mountainous-wave portion 35b with 1.5 elevated portions. Thus, such a valve can also provide an operational effect substantially similar to that of the aforementioned embodiment.

What is claimed is:
1. A diaphragm-actuated fluid control valve comprising:
a valve for controlling a flow rate or pressure of a valve fluid;
a partition;
a valve body with an inlet port, an outlet port, and an orifice provided therebetween, the orifice being adapted to be opened or closed by the valve; and
a diaphragm device adapted to drive the valve in a direction to open or close the orifice,
wherein:
the valve, the inlet port and the outlet port are provided below the partition,
the diaphragm device has a diaphragm, a diaphragm-holding member that fixedly seals an outermost peripheral portion of the diaphragm, a first pressure chamber defined between an upper portion of the diaphragm device and an upper surface side of the diaphragm, a first port for providing a sensing fluid into the first pressure chamber, and a second pressure chamber defined between the partition and a lower surface of the diaphragm, the second pressure chamber being formed to operatively communicate with and drive the valve in response to fluidic pressure in at least the first pressure chamber,
the valve is connected to an innermost portion of the lower surface of the diaphragm via an actuating rod,
the diaphragm-holding member is fixedly sealed to the valve body and the innermost portion of the diaphragm abuts a disk member that is urged against the diaphragm by a compression coil spring that is disposed in a contracted position,
a radial portion between the peripheral portion and the central region of the diaphragm is further formed as a plurality of concentric circles when viewed in a plan view and N+(0.5) mountainous-wave portions peak-to-peak in length when viewed in cross section where N is a positive integer with a value of 3 or less, and
a bottom surface of the peripheral portion of the diaphragm defining a reference plane and a bottom surface of the central region of the diaphragm defining a central region plane, the diaphragm is formed such that a distance between the central region plane of the diaphragm and the reference plane of the peripheral portion of the diaphragm is equal to a peak-to-peak amplitude of the mountainous wave portions of the diaphragm when a pressure difference between the first pressure chamber and the second pressure chamber configures the valve in a fully closed position, the peak-to-peak amplitude being defined as a distance between a vertex of the mountainous wave portion along the central region plane and a foot of the mountainous wave portion along the reference plane.

2. The diaphragm-actuated fluid control valve according to claim 1, wherein peak-to-peak amplitudes of the mountainous wave portions are substantially the same.

3. The diaphragm-actuated fluid control valve according to claim 1, wherein the diaphragm is stainless steel plate with a thickness of 0.05 to 0.15 mm.

4. The diaphragm-actuated fluid control valve according to claim 1, wherein an outer diameter and an inner diameter of the mountainous wave portions of the diaphragm are 18-35 mm and 10-22 mm, respectively.

5. The diaphragm-actuated fluid control valve according to claim 1, wherein the diaphragm-actuated control valve is an expansion valve in a refrigeration cycle.

6. The diaphragm-actuated fluid control valve according to claim 1, wherein the compression spring has a first end positioned to directly contact with and urge the disk member against the lower surface side of the diaphragm.

7. The diaphragm-actuated fluid control valve according to claim 1, wherein the disk member and the compression coil spring are positioned in the second pressure chamber above the partition.

8. The diaphragm-actuated fluid control valve according to claim 1, wherein the diaphragm device is configured such that displacement of the diaphragm is based on a shape of the diaphragm displacing only in response to pressure from the first pressure chamber, the compression coil spring and operation of the valve with the inlet port and the outlet port below the partition.

9. The diaphragm-actuated fluid control valve according to claim 1, wherein the diaphragm device further includes the disk member being positioned adjacent the lower surface side of the diaphragm, the compression spring having a first end positioned to urge the disk member against the lower surface side of the diaphragm, and a spring-receiving member having a second end of the compression spring positioned therein.

10. The diaphragm-actuated fluid control valve according to claim 9, wherein the disk member is in direct contact with the lower surface side of the diaphragm, and
the spring-receiving member is operatively connected to the compression spring so as to be movably adjustable along a longitudinal axis of the compression spring and thereby movably adjust a preload of the compression spring.

11. The diaphragm-actuated fluid control valve according to claim 9, wherein the spring-receiving member is operatively connected to the compression spring so as to be movably adjustable along a longitudinal axis of the compression spring and thereby movably adjust a preload of the compression spring, and the fluid control valve further comprises:
an adjusting element operatively connected to the spring-receiving member so as to controllably adjust the preload of the compression spring, wherein the adjusting element is operatively formed to extend through the valve body and contact the spring-receiving member such that the adjusting element is movably positionable to controllably adjust the preload of the compression spring from outside of the valve body.

12. The diaphragm-actuated fluid control valve according to claim 11, wherein the adjusting element is movably positionable to controllably adjust the preload of the compression spring along an axis offset from the longitudinal axis of the compression spring.

13. A diaphragm-actuated fluid control valve comprising:
a valve for controlling a flow rate or pressure of a valve fluid;
a partition;
a valve body with an inlet port, an outlet port, and an orifice provided therebetween, the orifice being adapted to be opened or closed by the valve; and
a diaphragm device adapted to drive the valve in a direction to open or close the orifice,
wherein:
the valve, the inlet port and the outlet port are provided below the partition,
the diaphragm device has a diaphragm, a diaphragm-holding member that fixedly seals the outermost peripheral portion of the diaphragm and defines an upper-side pressure chamber between an upper surface side of the diaphragm and the diaphragm-holding member, a lower-side pressure chamber being defined between a lower surface of the diaphragm and the partition in the valve body, a disk member positioned to abut an innermost portion of the lower surface side of the diaphragm, a compression spring having a first end positioned to urge the disk member against the lower surface side of the diaphragm and being disposed in a contracted position, and a spring-receiving member having a second end of the compression spring positioned therein,
the valve is connected to the innermost portion of the lower surface of the diaphragm via an actuating rod,
the diaphragm-holding member is fixedly sealed to the valve body,
a radial portion between the peripheral portion and the central region of the diaphragm is further formed as a plurality of concentric circles when viewed in a plan view and N+(0.5) mountainous-wave portions peak-to-peak in length when viewed in cross section where N is a positive integer with a value of 3 or less, and
a bottom surface of the peripheral portion of the diaphragm defining a reference plane and a bottom surface of the central region of the diaphragm defining a central region plane, the diaphragm is formed such that a distance between the central region plane of the diaphragm and the reference plane of the peripheral portion of the diaphragm is equal to a peak-to-peak amplitude of the mountainous wave portions of the diaphragm when a pressure difference between the first pressure chamber and the second pressure chamber configures the valve in a fully closed position, the peak-to-peak amplitude being defined as a distance between a vertex of the mountainous wave portion along the central region plane and a foot of the mountainous wave portion along the reference plane.

14. The diaphragm-actuated fluid control valve according to claim 13, wherein the disk member is in direct contact with the lower surface side of the diaphragm, and
the spring-receiving member is operatively connected to the compression spring so as to be movably adjustable along a longitudinal axis of the compression spring and thereby movably adjust a preload of the compression spring.

15. The diaphragm-actuated fluid control valve according to claim 13, wherein peak-to-peak amplitudes of the mountainous wave portions are substantially the same.

16. The diaphragm-actuated fluid control valve according to claim 13, wherein the diaphragm is stainless steel plate with a thickness of 0.05 to 0.15 mm.

17. The diaphragm-actuated fluid control valve according to claim 13, wherein an outer diameter and an inner diameter of the mountainous wave portions of the diaphragm are 18-35 mm and 10-22 mm, respectively.

18. The diaphragm-actuated fluid control valve according to claim 13, wherein the diaphragm-actuated control valve is an expansion valve in a refrigeration cycle.

19. The diaphragm-actuated fluid control valve according to claim 13, wherein the first end of the compression spring is further positioned to directly contact with and urge the disk member against the lower surface side of the diaphragm.

20. The diaphragm-actuated fluid control valve according to claim 13, wherein the disk member, the spring-receiving member and the compression coil spring are positioned in the lower-side pressure chamber above the partition.

21. The diaphragm-actuated fluid control valve according to claim 13, wherein the diaphragm device is configured such that displacement of the diaphragm is based on a shape of the diaphragm displacing only in response to pressure from the upper-side pressure chamber, the compression coil spring and operation of the valve with the inlet port and the outlet port below the partition.

22. The diaphragm-actuated fluid control valve according to claim 13, wherein the spring-receiving member is operatively connected to the compression spring so as to be movably adjustable along a longitudinal axis of the compression spring and thereby movably adjust a preload of the compression spring, and the fluid control valve further comprises:

an adjusting element operatively connected to the spring-receiving member so as to controllably adjust the preload of the compression spring, wherein the adjusting element is operatively formed to extend through the valve body and contact the spring-receiving member such that the adjusting element is movably positionable to controllably adjust the preload of the compression spring from outside of the valve body.

23. The diaphragm-actuated fluid control valve according to claim 22, wherein the adjusting element is movably positionable to controllably adjust the preload of the compression spring along an axis offset from the longitudinal axis of the compression spring.

* * * * *